US012188610B2

(12) United States Patent
Yoder et al.

(10) Patent No.: US 12,188,610 B2
(45) Date of Patent: Jan. 7, 2025

(54) CONFIGURABLE BASE PLATE SYSTEM FOR INDUSTRIAL PUMPS

(71) Applicant: Cornell Pump Company LLC, Clackamas, OR (US)

(72) Inventors: Brandon Yoder, Estacada, OR (US); Jordan R. White, Canby, OR (US); Andrew Enterline, Troutdale, OR (US)

(73) Assignee: CORNELL PUMP COMPANY LLC, Clackamas, OR (US)

( * ) Notice: Subject to any disclaimer, the term of this patent is extended or adjusted under 35 U.S.C. 154(b) by 45 days.

(21) Appl. No.: 18/069,428

(22) Filed: Dec. 21, 2022

(65) Prior Publication Data
US 2023/0213139 A1    Jul. 6, 2023

Related U.S. Application Data

(60) Provisional application No. 63/295,969, filed on Jan. 3, 2022.

(51) Int. Cl.
*F16M 5/00* (2006.01)
*F04B 17/03* (2006.01)
(Continued)

(52) U.S. Cl.
CPC .............. *F16M 5/00* (2013.01); *F04B 17/03* (2013.01); *F04B 53/16* (2013.01); *F04B 53/22* (2013.01);
(Continued)

(58) Field of Classification Search
CPC .. F04D 13/06; F04D 25/06; F04D 29/60–648; H02K 5/00; H02K 5/26;
(Continued)

(56) References Cited

U.S. PATENT DOCUMENTS 1,926,392 A * 9/1933 Kritzer ................ H02K 5/26
248/657
2,646,951 A * 7/1953 Sloyan ................ H02K 5/26
248/655
(Continued)

FOREIGN PATENT DOCUMENTS

CN    109630394 A    4/2019
CN    111720300 A    9/2020

OTHER PUBLICATIONS

International Search Report and Written Opinion issued in corresponding International Application No. PCT/US2022/082111, mailed on Apr. 3, 2023, 14 pages.
(Continued)

Primary Examiner — Kenneth J Hansen
Assistant Examiner — Chirag Jariwala
(74) Attorney, Agent, or Firm — Snyder, Clark, Lesch & Chung, LLP

(57) ABSTRACT

Systems and methods described herein provide a configurable base plate for industrial pump configurations, including different combinations of pump, motor, and coupling types. Slotted motor adapters allow for axial adjustment of the motor position, and movable threaded mounting lugs lock in the motor position for ease of future maintenance, replacement, disassembly, and repeated reassembly. The mounting lugs are locked into place by affixing jackscrew lugs, which serve to both semi-permanently locate the motor mounting locations, and also provide a point to install a jackscrew used to finely adjust motor position and coupling alignment. A single adjustable coupling guard is compatible with a variety of pump, coupling, and motor configurations that fit on the base plate.

16 Claims, 7 Drawing Sheets

(51) Int. Cl.
*F04B 53/16* (2006.01)
*F04B 53/22* (2006.01)
*F04D 29/60* (2006.01)

(52) U.S. Cl.
CPC ......... *F04D 29/60* (2013.01); *F16M 2200/08* (2013.01)

(58) Field of Classification Search
CPC .......... F04B 17/03; F04B 17/06; F04B 53/16; F04B 53/22; F16M 5/00; F16M 2200/08
USPC ........ 310/91; 248/346.01, 346.03, 357, 678; 417/359, 360
See application file for complete search history.

(56) References Cited

U.S. PATENT DOCUMENTS

| | | | |
|---|---|---|---|
| 2,662,988 A * | 12/1953 | McKim | H02K 5/00 254/133 R |
| 2,765,997 A * | 10/1956 | Motts | H02K 5/26 248/657 |
| 3,021,100 A * | 2/1962 | Verhota | F16M 7/00 248/646 |
| 3,588,009 A * | 6/1971 | Koehlke et al. | F16M 5/00 248/668 |
| 6,190,261 B1 * | 2/2001 | Powell | F16P 1/02 464/170 |
| 6,715,994 B2 | 4/2004 | Patel et al. | |
| 7,322,805 B2 | 1/2008 | Biver et al. | |
| 8,162,596 B1 | 4/2012 | Kamio | |
| 8,328,540 B2 | 12/2012 | Wang | |
| 8,561,656 B2 | 10/2013 | Eginton et al. | |
| 8,939,736 B2 | 1/2015 | Israelson et al. | |
| 9,605,703 B2 | 3/2017 | Halabi | |
| 9,810,241 B2 | 11/2017 | Gell et al. | |
| 9,822,542 B2 | 11/2017 | Panzella | |
| 9,951,780 B2 | 4/2018 | McKinzie et al. | |
| 10,458,415 B2 | 10/2019 | Knapp et al. | |
| 10,465,836 B2 * | 11/2019 | Copanas | F16M 7/00 |
| 10,940,570 B2 | 3/2021 | Chang et al. | |
| 2006/0117895 A1 * | 6/2006 | Sevenster | F04D 29/628 74/490.01 |
| 2009/0264209 A1 * | 10/2009 | LaBarge, III | F16D 3/841 464/171 |
| 2014/0311283 A1 * | 10/2014 | Cocks | F16P 1/02 74/608 |
| 2015/0093266 A1 * | 4/2015 | Nelson | F04D 29/605 417/321 |
| 2015/0280514 A1 * | 10/2015 | Norris | H02K 5/26 474/115 |
| 2017/0312908 A1 | 11/2017 | Judge | |
| 2018/0045359 A1 * | 2/2018 | Lauer | F16M 5/00 |
| 2019/0032667 A1 | 1/2019 | Ifrim et al. | |
| 2021/0269248 A1 * | 9/2021 | Banasik | F16H 57/045 |

OTHER PUBLICATIONS

"Goulds ANSI Centrifugal Pump Cutaway," DAC Worldwide, <https://dacworldwide.com/product/goulds-ansi-centrifugal-pump-cutaway/>, accessed Dec. 21, 2022.

* cited by examiner

CONFIGURABLE BASE PLATE SYSTEM FOR INDUSTRIAL PUMPS

CROSS-REFERENCE TO RELATED APPLICATION

This application claims priority under 35 U.S.C. § 119, based on U.S. Provisional Patent Application No. 63/295,969 filed Jan. 3, 2022, titled "Configurable Base Plate System for Industrial Pumps," the disclosure of which is hereby incorporated by reference.

BACKGROUND OF THE INVENTION

Different industrial pumps may be combined with different motors and couplings to meet service requirements for a given application. A pump/motor combination is typically supported by a unique base plate that matches the particular combination.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Systems and methods described herein provide a configurable base plate for industrial pump configurations, including different combinations of pump, motor, and coupling types. Implementation described herein allow a modular adaptation of common pump sizes to fit with varieties of coupling sizes, motor sizes, and coupling lengths. A universal base plate utilizes slotted motor adapters to allow for axial adjustment of the motor position, with movable threaded mounting lugs that then lock in the motor position for ease of future maintenance, replacement, disassembly, and repeated reassembly. The mounting lugs are locked into place by affixing jackscrew lugs, which serve to both semi-permanently locate the motor mounting locations, and also provide a point to install a jackscrew (e.g., a screw that is used to finely adjust motor position and coupling alignment). A single coupling guard is provided that is compatible with a variety of pump, coupling, and motor configurations that fit on the base plate.

The flexibility to accept different pump, motor, and coupling configurations with the configurable base plate system may eliminate the need to design a unique fabricated and machined base plate for each different pump/motor/coupling combination. Previously, unique base plate and coupling guard designs have been generated for each combination of pump model and motor size dependent on coupling; resulting in hundreds of unique designs that may only be manufactured once. This previous method causes part and inventory systems to be populated with many one-time use part numbers and redrawing of components, leading to engineering errors. Furthermore, buying low quantities of parts to order results in high cost and long lead times.

In contrast with use of conventional pump base plates, the configurable base plate system described herein may include standardized parts. With use of standardized parts, re-drawing can be limited, reducing drawing errors. Part costs will be reduced by decreasing the number of parts and increasing the order quantity of each stock keeping unit (SKU). The design of the configurable base plate also allows for reduced cost by manufacturing from multiple formed steel plates that are bolted together at assembly (eliminating welding), and utilizing modern laser cutting manufacturing methods (eliminating additional machining processes).

Figure 1:
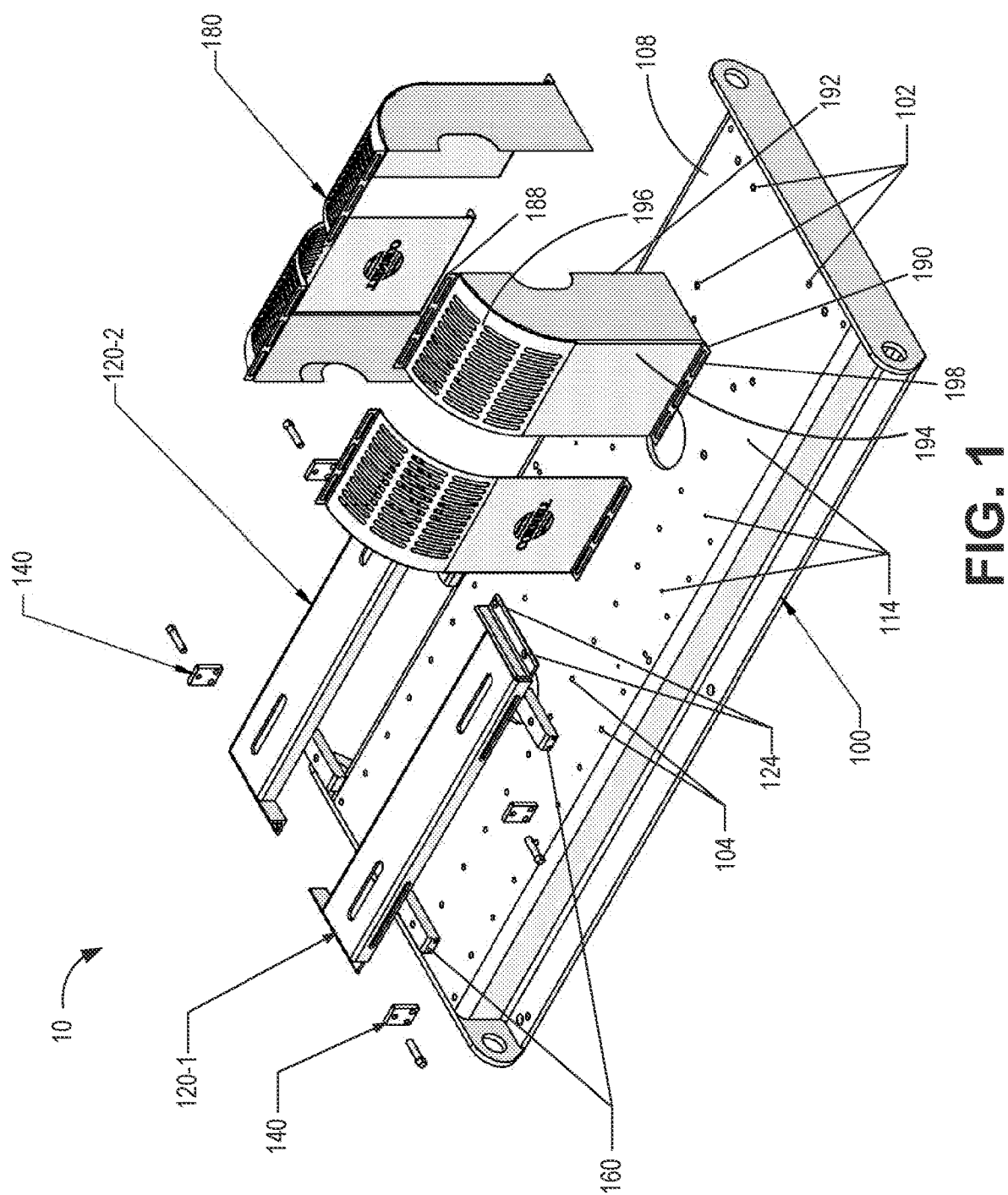
FIG. 1 is an exploded perspective view of a configurable base plate system, according to an implementation described herein.
Figure 2:
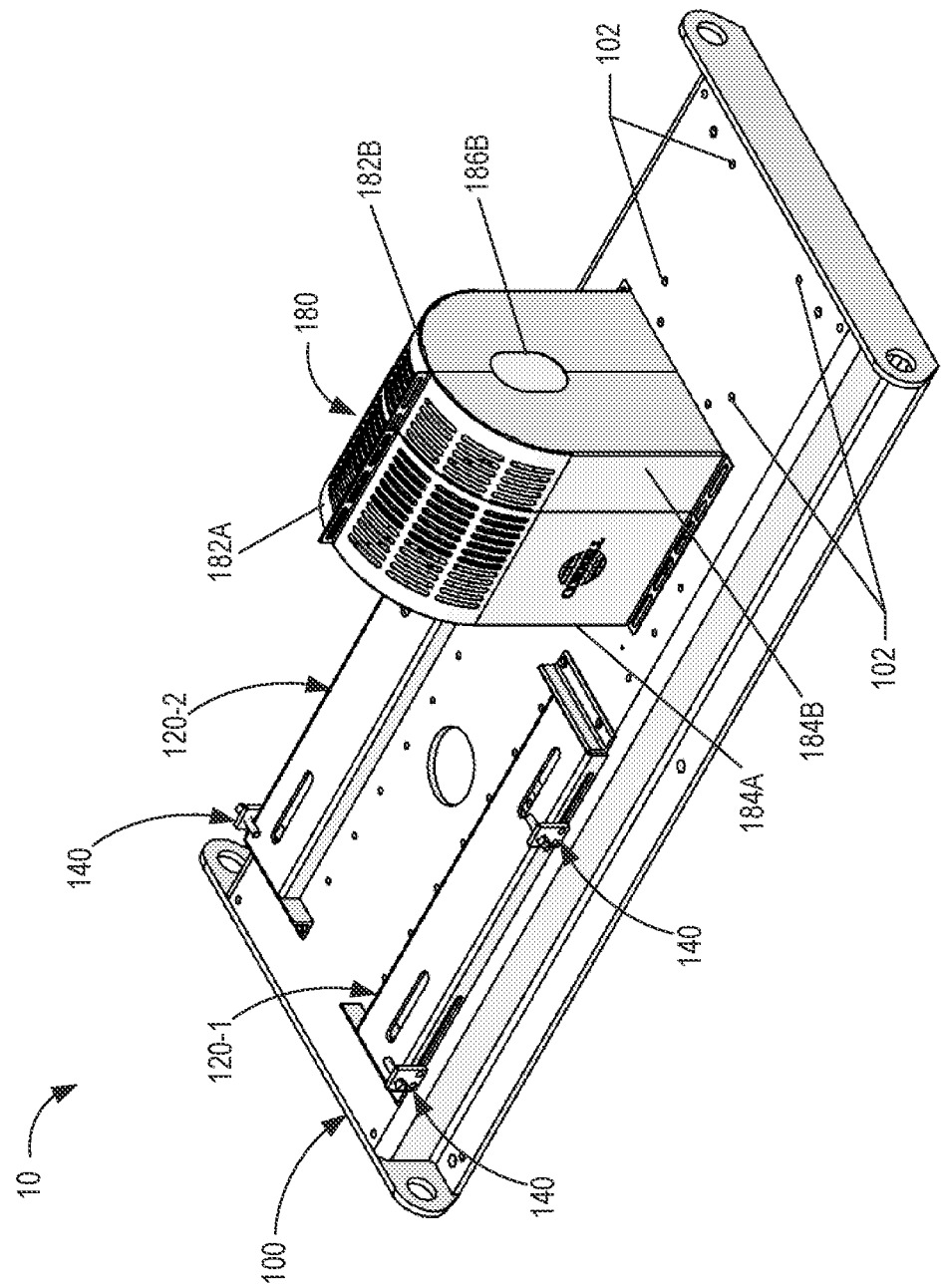
FIG. 2 is a perspective view of the configurable base plate system of FIG. 1.
Figure 3:
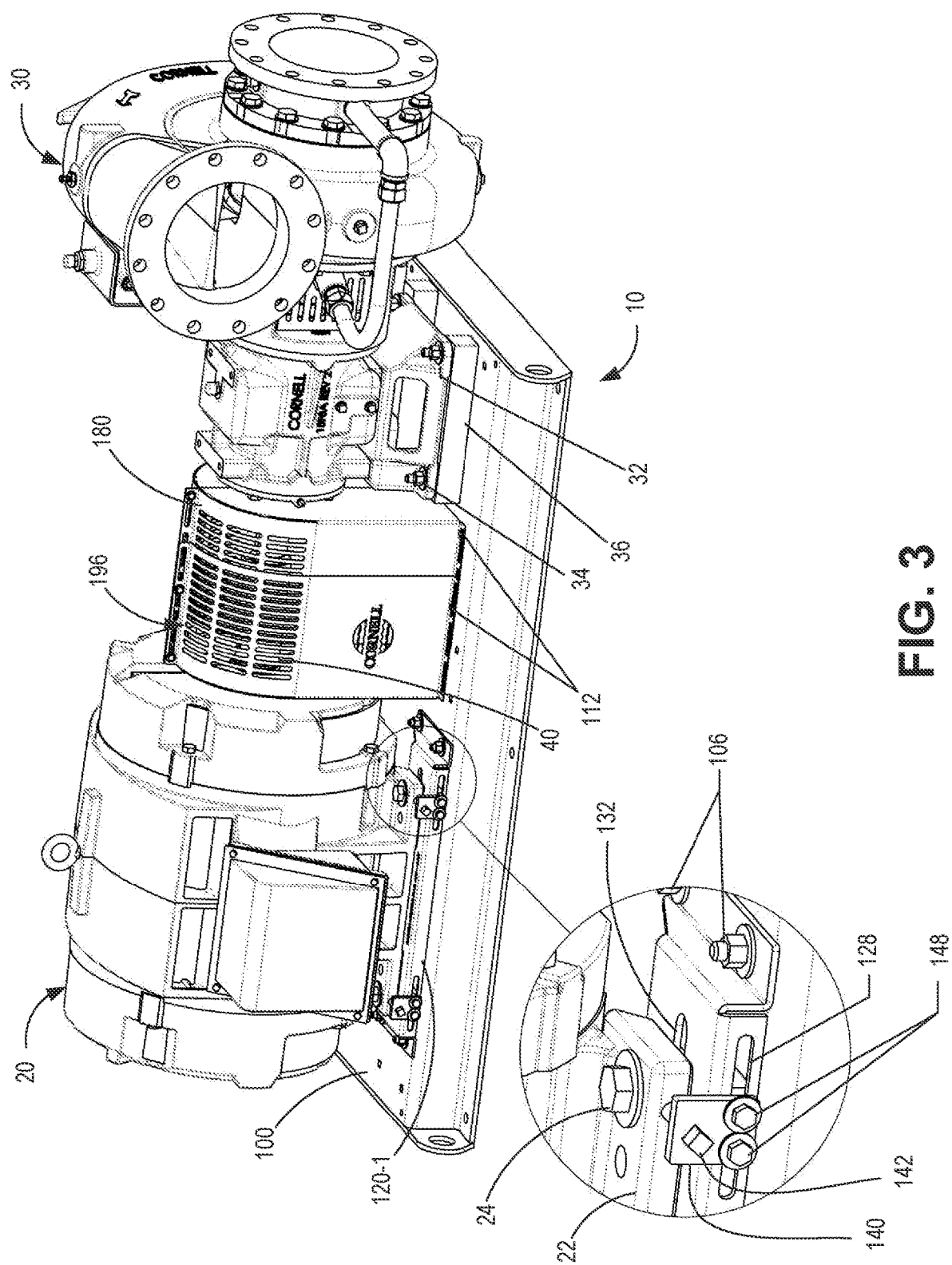
FIG. 3 is a perspective view of the configurable base plate system of FIG. 1 installed with an example pump and motor.
Figure 4:
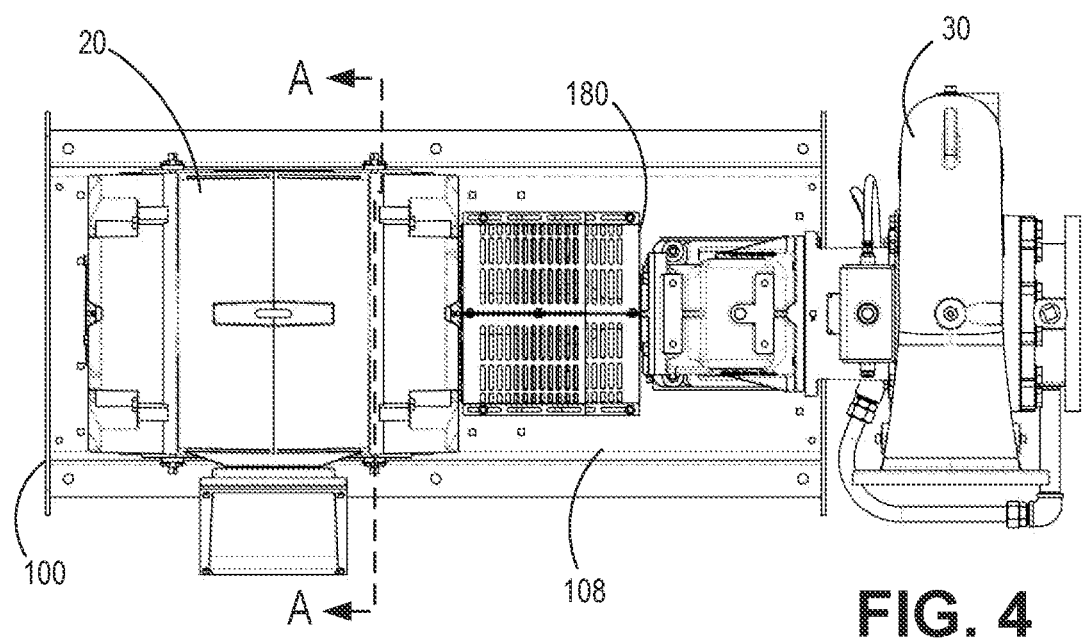
FIG. 4 is a top view of the installation of FIG. 3.
Figure 5:
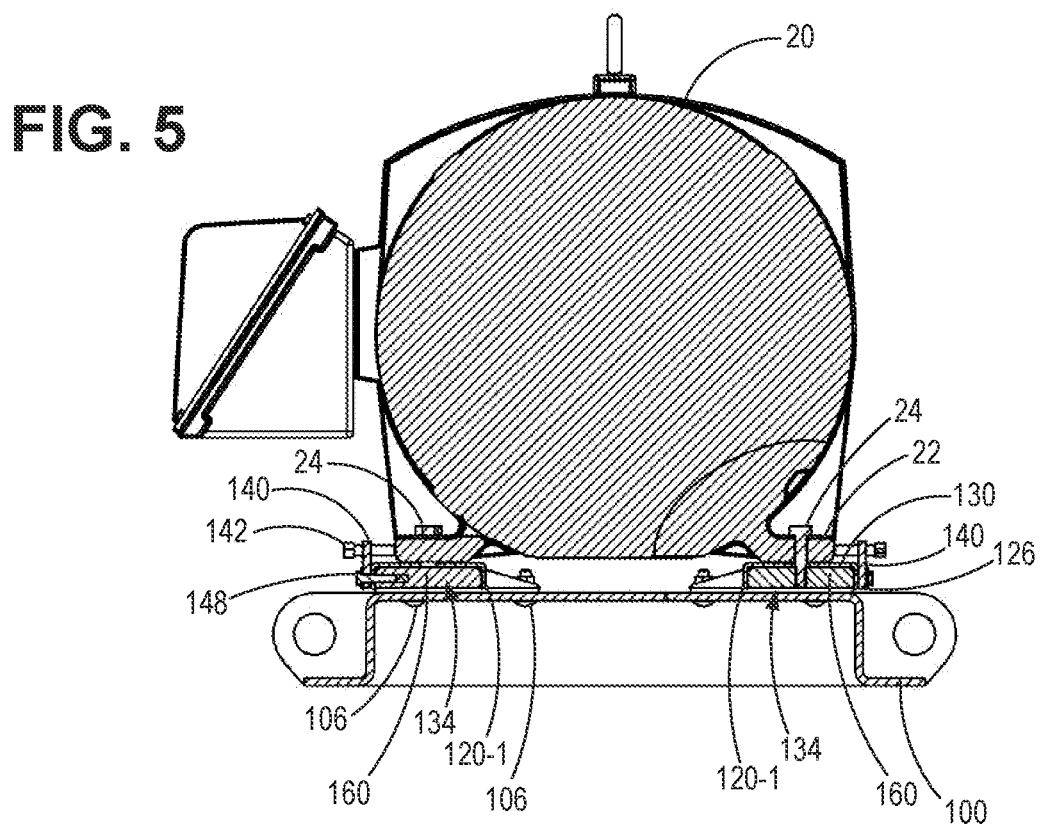
FIG. 5 is a cross-sectional end view of the installation of FIG. 3.
Figure 6:
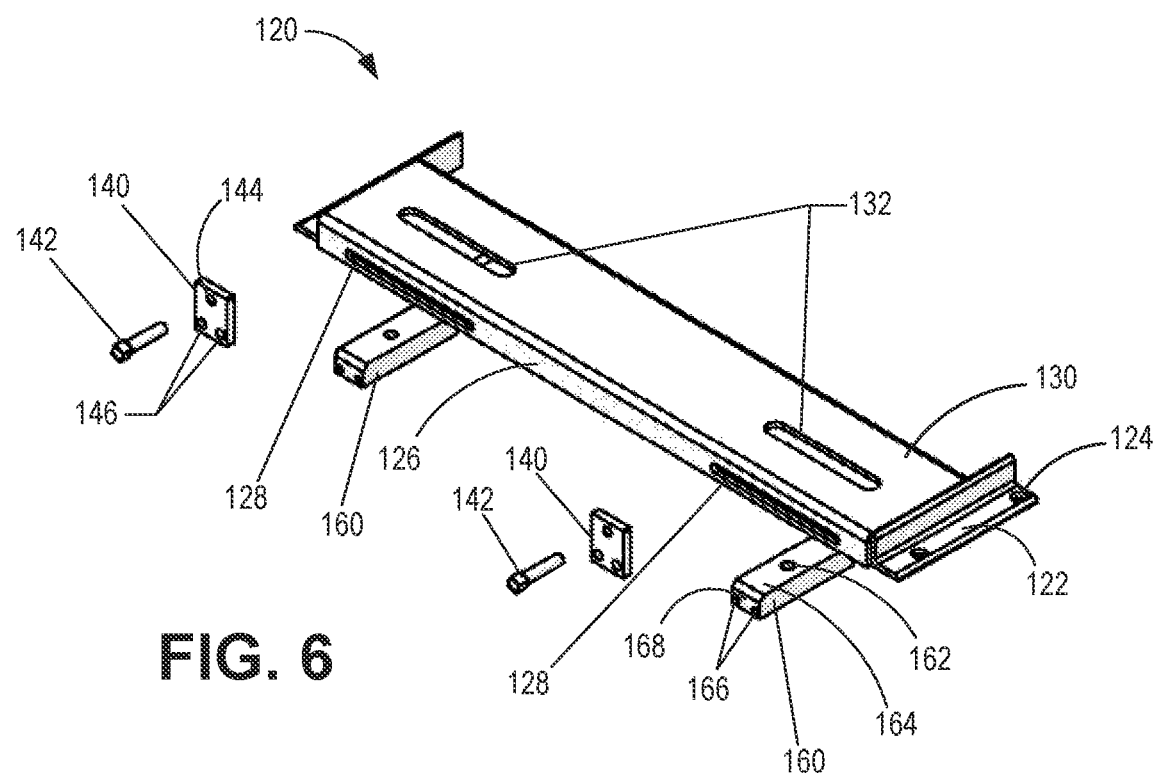
FIG. 6 is an exploded view of a slotted motor adapter, according to an implementation.

FIG. 1 is a schematic exploded view of a configurable base plate system 10, according to an implementation described herein. FIG. 2 is a perspective view of configurable base plate system 10 in a partially assembled configuration. FIG. 3 is a perspective view of configurable base plate system 10 installed with a pump and motor. FIG. 4 is a top view of the installation of FIG. 3, and FIG. 5 is a cross-section end view along section A-A of FIG. 4. FIG. 6 is an exploded view of a slotted motor adapter, according to an implementation.

Referring collectively to FIGS. 1-6, configurable base plate system 10 may include a modular base plate 100, slotted motor adaptors 120-1 and 120-2 (generically referred to as slotted motor adaptor 120), adjustable jackscrew lugs 140, mounting lugs 160, and an adjustable coupling guard 180. As shown in FIG. 3, motor assembly 20 and pump assembly 30 may be mounted to modular base plate 100. Pump assembly 30 and motor assembly 20 may be connected via a coupling 40 (e.g., covered by coupling guard 180 in FIG. 3) that connects motor assembly 20 to pump assembly 30. Generally, for proper operation, motor assembly 20 and pump assembly 30 need to be mounted with axial alignment along a drive shaft (not shown).

Motor assembly 20 may include a set of mounting holes in feet 22. Mounting hole configurations for motor assembly 20 may conform generally to National Electrical Manufacturers Association (NEMA) standards. Different types/sizes of motor assembly 20 may have different mounting hole configurations to accommodate different motor dimensions and weights.

Pump assembly 30 may include a bearing frame 32 that may be mounted to modular base plate 100. Bearing frame 32 may include base or feet with mounting holes therein. The configuration/spacing of the mounting holes in bearing frame 32 may be standardized and/or consistent for different pump types and sizes (e.g., from a same pump manufacturer).

Modular base plate 100 may be formed from a steel plate that may be shaped into multiple planes. Modular base plate 100 may include mounting holes 102 that are configured to align with mounting holes of bearing frame 32 and receive bolts 34 therethrough to secure bearing frame 32 of pump assembly 30 to modular base plate 100. In some implementations, bearing frame 32 may be mounted on a spacer 36 to allow for vertical alignment of pump assembly 30 with motor assembly 20.

Modular base plate 100 may also include mounting holes 104 that are configured to receive threaded fasteners 106 (FIG. 3) for each slotted motor adaptor 120. In one implementation, mounting holes 104 may be round threaded holes into which threaded fasteners 106 may be secured. In another implementation, mounting holes 104 may be square holes with straight bores, and threaded fasteners 106 may include, for example, a carriage-type bolt, washer, and nut combination that may be tightened to secure slotted motor adaptor 120 to modular base plate 100. A series of mounting holes 104 may extend longitudinally along a top surface 108 of modular base plate 100. Mounting holes 104 may be configured to align with openings 124 of slotted motor adaptors 120. The length of each slotted motor adaptor 120 and the longitudinal spacing of mounting holes 104 may be complimentary, such that slotted motor adaptors 120 may be positioned in different positions, relative to modular base plate 100, over mounting hole 104 pairs.

Each slotted motor adaptor 120 may be formed from a steel plate and configured to be secured to modular base plate 100. For example, a slotted motor adaptor 120 may be secured to modular base plate 100 by inserting threaded fasteners 106 through openings 124 and corresponding selected holes 104. As shown in FIG. 6, for example, in one implementation, slotted motor adaptor 120 may include a one or more mounting flange 122 with openings 124. Slotted motor adaptor 120 also include a substantially vertical planar section 126 including one or more slots 128 and a substantially horizontal planar section 130 including one or more slots 132. Adaptor mounting holes 104 are spaced lengthwise apart, for example, at a distance not greater than the length of slot 128 and/or slot 132. Although two sets of slots 128/132 are shown for each slotted motor adaptor 120, in other implementations, additional sets of slots 128/132 (e.g., three or more) may be included in slotted motor adaptor 120. In still other implementations, slotted motor adaptors 120 may be provided in different lengths with different lengthwise spacing between slots 132 (and slots 128). According to an implementation, two slotted motor adaptors 120 may be arranged as mirror images on surface 108 of modular base plate 100.

Planar section 126 and planar section 130 of slotted motor adaptor 120 may form a cavity 134 (FIG. 5) into which one or more mounting lugs 160 may be inserted. Slotted motor adaptors 120 and mounting lugs 160 may be configured to collectively support the weight of motor assembly 20. Each mounting lug 160 may include a hole 162 on a top surface 164 that is substantially parallel to planar section 126 (e.g., when both slotted motor adaptor 120 and mounting lug 160 are installed on modular base plate 100) and a pair of holes 166 that are on a surface 168 that is substantially parallel to planar section 126 (e.g., when both slotted motor adaptor 120 and mounting lug 160 are installed on modular base plate 100). Mounting lug 160 may be inserted into cavity 134 such that hole 162 of mounting lug 160 may align with one of slots 132, and holes 166 may align with one of slots 128.

Hole 162 of mounting lug 160 may be configured to receive a threaded hold-down bolt 24 that extends through the feet 22 of motor assembly 20 (FIGS. 3 and 5). Insertion of bolt 24 through slot 132 and into hole 162 may secure motor assembly 20 to slotted motor adaptor 120. According to an implementation, slots 132 and 128 may be aligned such that they are equally spaced, generally of equal length, and parallel to each other.

Adjustable jackscrew lug 140 may be mounted indirectly or directly to slotted motor adaptors 120 to permit minor position adjustment of motor assembly 20 relative to pump assembly 30 (e.g., for precise alignment of coupling 40). For example, adjustable jackscrew lug 140 may be configured to be secured to mounting lug 160. Adjustable jackscrew lug 140 may include a small substantially flat plate including jackscrew hole 144 a pair of holes 146 that align with holes 166 of mounting lug 160. Jackscrew hole 144 may include a threaded hole configured to receive jackscrew 142 therethrough. Holes 146 may be configured to align with holes 166 of mounting lug 160 and receive mounting screws 148 (FIG. 4) therethrough. Insertion of screws 148 through holes 146 and slot 128 into holes 166 may secure mounting lug 160 in a semi-permanent position against slotted motor adaptor 120 and secure jackscrew lug 140 to mounting lug 160. Mounting lug 160 may be slidably adjusted along the length of slots 128 and slots 132 to align hole 162 with a selected mounting hole in feet 22 of motor assembly 20 (e.g., such that motor assembly 20, pump assembly 30, and coupling 40 are aligned.

After jackscrew lug 140 is tightly secured by screws 148, jackscrew 142 may be inserted into jackscrew hole 144 and adjusted to perform precise alignment of the feet 22 of motor assembly 20 with holes 162 of mounting lugs 160. Upon completion of such alignment for all jackscrew lugs 140, motor assembly 20 and mounting lugs 160 may be locked in place by bolts 24. More particularly, bolts 24 may be inserted through holes in feet 22 of motor assembly 20 and slot 132 of slotted motor adaptor 120, and tightened into hole 162 of mounting lugs 160.

Coupling guard 180 includes multiple overlapping panels configured for adjusting a length of the coupling guard. According to an implementation, coupling guard 180 may include two sets of vented overlapping panels 182A/B and 184A/B (FIG. 2). Each of panels 182A/B and 184A/B may include a slotted upper flange 188 and a slotted base flange 190. As shown, for example, in FIG. 1, each of panels 182A/B and 184A/B may also include a front/rear wall 192, a side wall 194, and a vented portion 196.

Panels 182A and 184A may be configured to fit around a coupling for motor assembly 20 and pump assembly 30. As shown, for example, in FIG. 2, panels 182A and 184A may be joined at flanges 188. Each of panels 182A and 184A may be joined to form a first side enclosure with an opening 186A. Similarly, each of panels 182B and 184B may be joined to form a first side enclosure with an opening 186B.

Joined panels 184A and 184B may be configured to fit within joined panels 182A and 182B, sliding relative to each other, such that adjustable coupling guard 180 may adjust to the axial length between motor assembly 20 and pump assembly 30 to cover couplings 40. More particularly, with the exception of flange 188 and 190, the outer perimeter of joined panels 184A and 184B may be slightly smaller than interior perimeter of joined panels 182A and 182B.

Openings 186A/B may be sized to accommodate a maximum diameter shaft size for motor assembly 20 and/or pump assembly 30. In another implementation, the area of front/rear wall 192 around opening 186A/B may be scored to enable breaking away of portions of front/rear wall 192 for enlargement of opening 186A/B to various sizes. Vented portion 196 may include slots, holes, perforations, or the like, to permit airflow within the area enclosed by coupling guard 180. As shown in FIG. 3, for example, vented portion 196 may generally be positioned above coupling 40 when coupling guard 180 is installed between motor assembly 20 and pump bearing frame 32.

Modular base plate 100 may further include coupling guard mounting holes 114 that are configured to receive screws 112 (FIG. 3). As shown in FIG. 1, a series of coupling guard mounting holes 114 may extend longitudinally along top surface 108 of modular base plate 100 to accommodate placement of adjustable coupling guard 180. Coupling guard mounting holes 114 may be configured to align with slots 198 in flanges 190 of adjustable coupling guard 180. Generally, coupling guard mounting holes 114 are spaced lengthwise apart at a distance not greater than the length of one of slots 198.

Bolts 24, 34 and fasteners 106, for example, may include a threaded metal bolts. Bolts 24, 34, and 106 may be made from, for example, stainless steel, zinc, and/or another metal material. Bolt 24 and 34 may be configured to correspond to (e.g., threadedly engage with) tapped mounting holes (e.g., holes, 102, 104) in modular base plate 100 or mounting lug 160 (e.g., holes 162). In one implementation, bolts 24, 34 and fasteners 106 may include a standard size hex head bolt. Screws 112, jackscrews 140, jackscrew lugs 142, and screws 148 may be made from the same or similar materials as bolts 24, 34 and fasteners 106.

Figure 7:
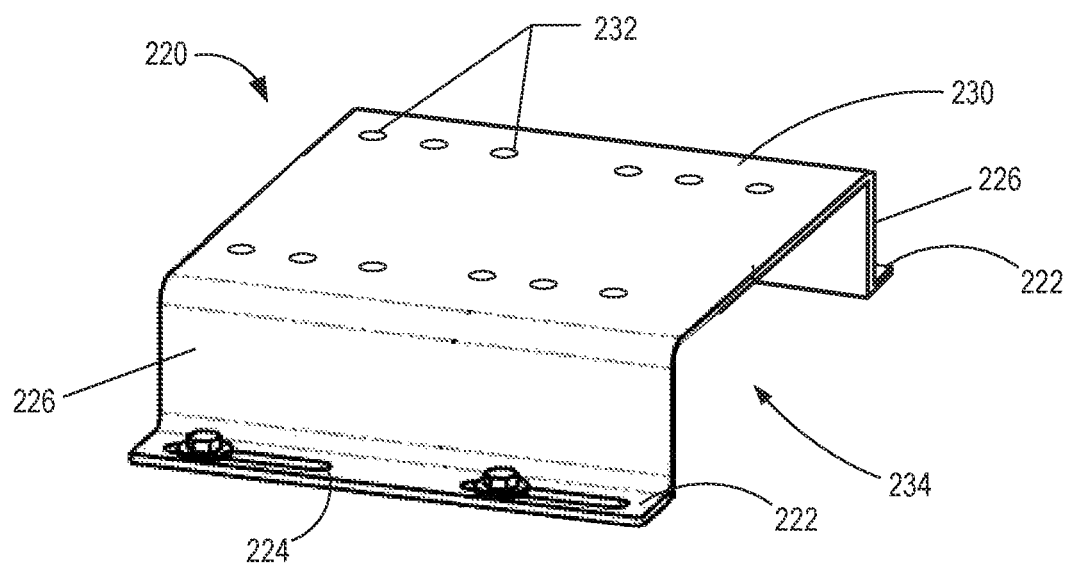
FIG. 7 is a perspective view of a tabletop motor adaptor, according to an implementation.
Figure 8:
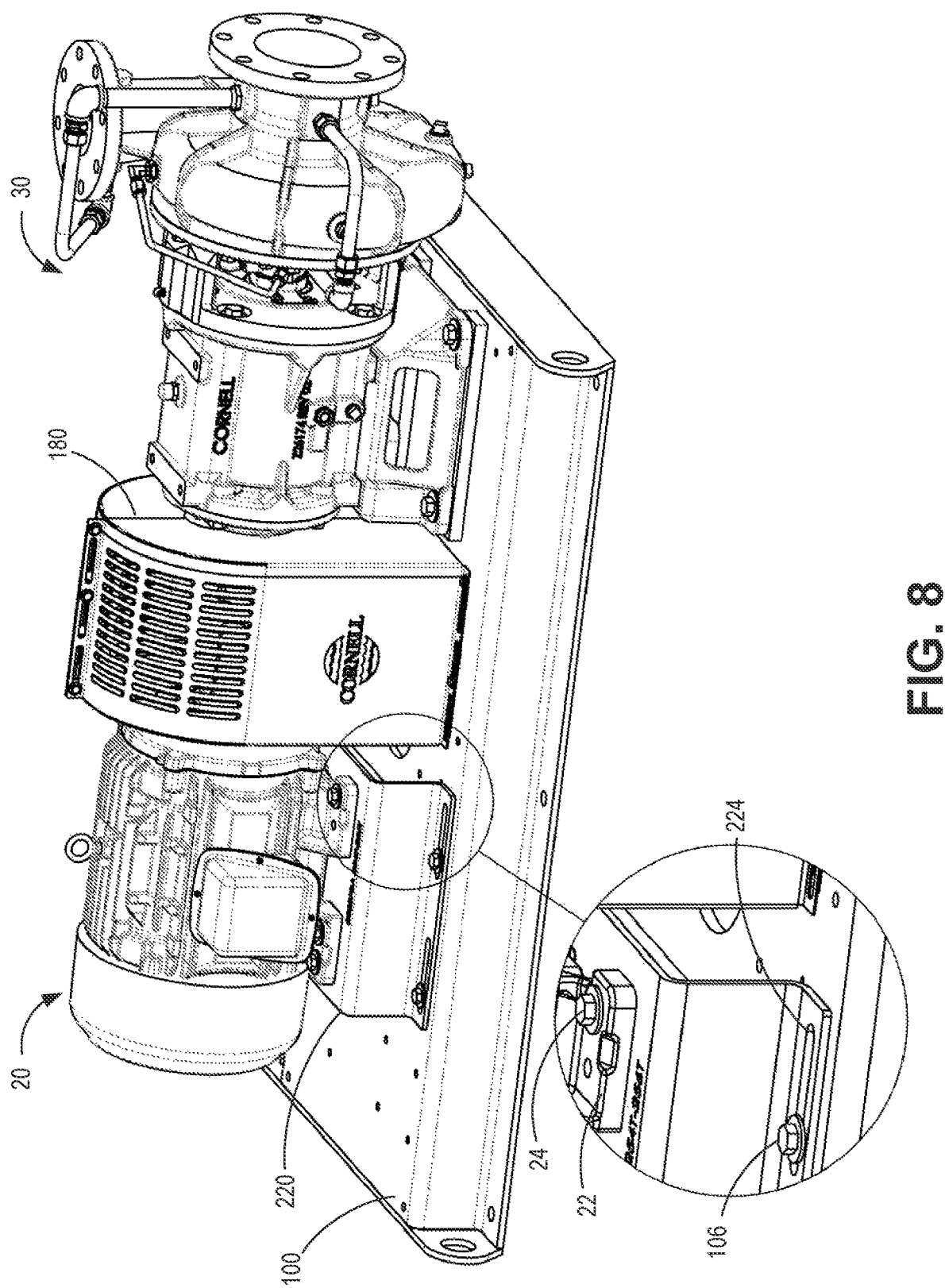
FIG. 8 is a perspective view of a configurable base plate system installed with a pump and motor using the tabletop motor adaptor.

The configuration of slotted motor adaptor 120 shown in FIGS. 1-6 may accommodate larger and heavier motor assemblies 20. For relatively smaller and lighter motor assemblies 20, a single tabletop motor adaptor 220 may be used in place of the two slotted motor adaptors 120, as illustrated in FIGS. 7 and 8. FIG. 7 is a perspective view of tabletop motor adaptor 220, and FIG. 8 is a perspective view of configurable base plate system 10 installed with a pump and motor using tabletop motor adaptor 220.

Tabletop motor adaptor 220 may be configured to be secured to modular base plate 100. Tabletop motor adaptor 220 may include mounting flanges 222 with openings 224. For example, tabletop motor adaptor 220 may be secured to modular base plate 100 by inserting threaded fasteners 106 through slotted openings 224 and selected holes 104. Adaptor mounting holes 104 may be spaced lengthwise apart, for example, at a distance not greater than the length of slotted openings 224 to accommodate different positions for motor assembly 20. Tabletop motor adaptor 220 may include substantially vertical planar sections 226 between mounting flanges 222 and a substantially horizontal planar section 230. Planar sections 226 and planar section 230 may form a channel or cavity 234. Substantially horizontal planar section 230 may include motor mounting holes 232 configured to align with mounting holes in feet 22 of motor assembly 20 and to receive hold-down bolts 24.

Figure 9:
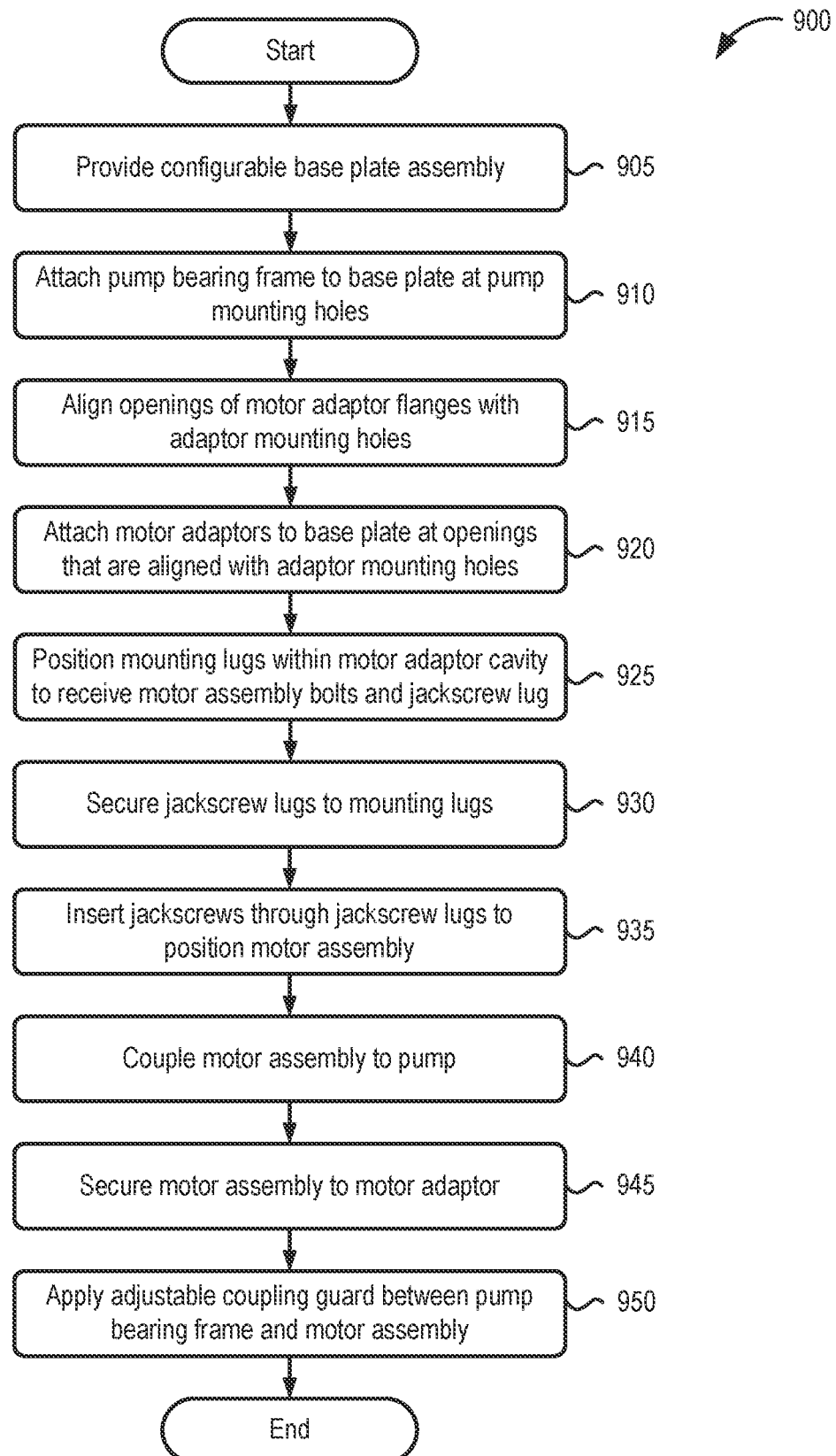
FIG. 9 is a flow diagram of an example process for mounting a pump and a motor to a base plate system, according to an implementation described herein.

FIG. 9 is a flow diagram of a process 900 for mounting a pump and a motor to a base plate system, according to an implementation described herein. Process 900 may include providing a configurable base plate system (block 905). For example, a technician may select a base plate system 10 that can be configured for use with a variety of different pump and motor combinations. As described above, base plate system 10 may include modular base plate 100, slotted motor adaptors 120, adjustable jackscrew lugs 140, mounting lugs 160, and an adjustable coupling guard 180.

Process 900 may also include attaching a pump bearing frame to the base plate at the pump mounting holes (block 910) and aligning openings of the motor adaptor flanges with the adaptor mounting holes (block 915). For example, a pump bearing frame 32 of pump assembly 30 may be secured to modular base plate 100 by inserting bolts 34 through bearing fame 32 into pump mounting holes 102. Based on the size/type of motor assembly 20, slotted motor adaptors 120 may be aligned with certain adaptor mounting holes 104 such that the location of slots 132 will generally align with the eventual location of mounting holes in the feet 22 of motor assembly 20.

Process 900 may further include attaching the motor adaptors to the base plate at openings that are aligned with the mounting holes (block 920), and positioning the mounting lugs within the motor adaptor cavity to receive hold-down bolts and a jackscrew lug (block 925). For example, a technician may attach slotted motor adaptors 120 to base plate 100 by inserting threaded fasteners 106 though the openings 124 of flange 122 that are aligned with adaptor mounting holes 104. Motor assembly 20 may be placed on slotted motor adaptors 120 in general alignment with pump assembly 30, and each of mounting lugs 160 may be positioned within each cavity 134 along a length of slot 132 to receive hold-down bolts 24 and along the length of slot 128 to receive screws 148 for jackscrew lug 140.

Process 900 may additionally include securing the jackscrew lugs to the mounting lugs (block 930), inserting jackscrews through the jackscrew lugs to position the motor assembly (block 935), and coupling the motor assembly to the pump (block 940). For example, jackscrew lugs 140 may be secured to mounting lugs 160 by inserting screws 148 through holes 146 and slot 128 into holes 166 of mounting lugs 160. When screws 148 are tightened, mounting blocks 160 may be locked in position. Jackscrews 142 may be inserted through holes 144 of jackscrew lug 140 to eventually contact motor assembly 20 and precisely adjust the axial alignment of motor assembly 20 with pump assembly 30. When proper alignment is achieved, the technician may apply a coupling mechanism to couple a shaft of motor assembly 20 to pump assembly 30.

Process 900 may also include securing the motor assembly to the motor adaptor (block 945) and applying an adjustable coupling guard between the pump bearing frame and the motor assembly (block 950). For example, the technician may tighten hold-down bolts 24 within each mounting lug 160 in a manner that secures motor assembly 20 to slotted motor adaptors 120. With the tightened hold-down bolts 24, motor assembly 20 is locked in place. The overlapping panels 182/184 of adjustable coupling guard 180 may be manipulated to make the length of the adjustable coupling guard substantially the same as the distance between pump bearing frame 32 and motor assembly 20. The adjustable coupling guard 180 may be inserted over the coupling between the pump bearing frame and the motor assembly; and attached to base plate 100 using screws 112 inserted through slots 122 into mounting holes 114.

A configurable base plate system and methods of use are provided. In one implementation, the base plate system includes a base plate, a motor adaptor, a mounting lug, and a jackscrew lug. The base plate includes pump mounting holes, which are configured to align with a pump bearing frame, and adaptor mounting holes. The motor adaptor is configured to support a motor assembly. The motor adaptor includes a first planar section with a first slot, a second planar section with a second slot that is substantially aligned with the first slot, and a flange with openings configured to align with at least some of the adaptor mounting holes. The first planar section and the second planar section form a cavity between the base plate and first planar section when the motor adaptor is secured to the base plate. A mounting lug is slidably disposed within the cavity, the mounting lug is configured to receive a hold-down bolt extending through the first slot and fasteners extending through the second slot. A jackscrew lug is configured to be secured to the mounting lug through the second slot, and is further configured to receive a jackscrew directed toward the motor assembly. The motor adaptor may be secured to the base plate at the openings of the flange that are aligned with the adaptor mounting holes. The mounting lug may be configured to slide within the cavity to receive the hold-down bolts along a length of the first slot and the jackscrew lug along a length of the second slot.

In another implementation base plate system, includes a base plate and a motor adaptor. The base plate may include pump mounting holes configured to align with a pump bearing frame and adaptor mounting holes. The motor adaptor may be configured to support a motor assembly. The motor adaptor may include a first planar section with slotted openings configured to align with at least some of the adaptor mounting holes, and a second planar section configured to receive a hold-down bolt extending through feet of a motor assembly. The base plate may be configured to slide along the slotted opening to position the motor assembly relative to the pump bearing frame. The motor adaptor may be locked in place against the base plate at the slotted openings when hold-down bolts are tightened into the adaptor mounting holes aligned with the slotted openings.

In still another implementation, a method for using a configurable base plate system includes providing a configurable base plate system including a modular base plate, a motor adaptor, mounting lug, and jackscrew lug as described herein. The method also includes attaching a pump bearing frame to the base plate at pump mounting holes; aligning openings of the motor adaptor flange with some of the adaptor mounting holes; and attaching the motor adaptor to the base plate at openings of the flange that are aligned with the adaptor mounting holes. The method also includes coupling the motor assembly to the pump; positioning the mounting lug within the cavity to receive a hold-down bolt along a length of a first slot and to receive the jackscrew lug along a length of the second slot. The method also incudes securing the jackscrew lug to the mounting lug through the second slot such that the securing locks the mounting lug in place; inserting a jackscrew through the jackscrew lug such that the jackscrew contacts the motor assembly; and tightening the hold-down bolt within the mounting lug in a manner that secures the motor assembly to the motor adaptor.

In some implementations, the base plate system may also include a coupling guard configured to fit over a coupling between the motor assembly and the pump bearing frame. The base plate may include coupling guard mounting holes, and the coupling guard may be configured to be mounted using the coupling guard mounting holes.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. Furthermore, terms referring to a position or orientation of a component, such as "vertical," "horizontal," "above," or "below," are used for purposes of description relative to the orientation of components shown in the corresponding drawings. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. A base plate system, comprising:
   a base plate including:
      adaptor mounting holes, and
      pump mounting holes configured to align with a pump bearing frame;
   a motor adaptor configured to support a motor assembly, the motor adaptor including:
      a first planar section with a first slot,
      a second planar section with a second slot that is aligned with the first slot, and
      a flange with openings configured to align with at least some of the adaptor mounting holes, wherein the first planar section and the second planar section form a cavity between the base plate and the first planar section when the motor adaptor is secured to the base plate;
   a mounting lug slidably disposed within the cavity, the mounting lug configured to receive a hold-down bolt extending through the first slot and to receive fasteners extending through the second slot; and
   a jackscrew lug configured to be secured to the mounting lug, wherein the jackscrew lug is further configured to receive a jackscrew directed toward the motor assembly,
   wherein the motor adaptor is secured to the base plate at the openings of the flange that are aligned with the at least some of the adaptor mounting holes, and
   wherein the mounting lug is configured to slide within the cavity to receive the hold-down bolt along a length of the first slot and the fasteners for the jackscrew lug along a length of the second slot.

2. The base plate system of claim 1, further comprising:
a coupling guard configured to fit over a coupling between the motor assembly and the pump bearing frame,
wherein the base plate further comprises coupling guard mounting holes, and
wherein the coupling guard is configured to be mounted using the coupling guard mounting holes.

3. The base plate system of claim 2, wherein the coupling guard includes multiple overlapping panels configured for adjusting a length of the coupling guard.

4. The base plate system of claim 2, wherein the coupling guard further incudes:
a base flange that includes third slots configured to be adjustably aligned with the coupling guard mounting holes.

5. The base plate system of claim 4, wherein the coupling guard mounting holes are spaced lengthwise apart at a distance not greater than a length of one of the third slots.

6. The base plate system of claim 2, wherein the coupling guard further incudes:
a vented portion that is positioned above the coupling when the coupling guard is installed between the motor assembly and the pump bearing frame.

7. The base plate system of claim 1, wherein the adaptor mounting holes are spaced lengthwise apart at a distance not greater than a length of the first slot.

8. The base plate system of claim 1, wherein the base plate system is configurable to receive differently-sized motor assemblies.

9. The base plate system of claim 1, wherein the second planar section is perpendicular to the first planar section.

10. The base plate system of claim 1, wherein the first slot is configured to align with feet of the motor assembly.

11. The base plate system of claim 1, wherein the motor adaptor includes a pair of motor adaptors, and wherein each motor adaptor of the pair of motor adaptors has two mounting lugs disposed within the cavity.

12. A base plate system, comprising:
a base plate;
a set of first motor adaptors configured to support a first motor assembly; and
a second motor adaptor configured to support a second motor assembly,
wherein the base plate includes:
adaptor mounting holes configured to selectively receive either the set of first motor adaptors or the second motor adaptor, and
pump mounting holes configured to align with a pump bearing frame;
wherein each first motor adaptor of the set of first motor adaptors includes:
a first planar section with a first slot and a second planar section with a second slot, wherein the second slot is aligned with the first slot,
a flange with openings configured to align with at least some of the adaptor mounting holes, wherein the first planar section and the second planar section together form a cavity between the base plate and the first planar section when the first motor adaptor is secured to the base plate,
a mounting lug slidably disposed within the cavity, the mounting lug configured to receive a corresponding hold-down bolt extending through the first slot and to receive fasteners extending through the second slot, and
a jackscrew lug configured to be secured to the mounting lug, wherein the jackscrew lug is further configured to receive a jackscrew directed toward the first motor assembly,
wherein each first motor adaptor of the set of first motor adaptors is secured to the base plate at the openings of the flange that are aligned with the at least some of the adaptor mounting holes,
wherein the mounting lug is configured to slide within the cavity to receive the corresponding hold-down bolt along a length of the first slot and the fasteners for the jackscrew lug along a length of the second slot; and
wherein, the second motor adaptor includes:
a third planar section with slotted openings configured to align with at least some of the adaptor mounting holes, and
a fourth planar section configured to receive a hold-down bolt extending through feet of the second motor assembly, wherein the second motor adaptor is configured to slide along the slotted openings to position the second motor assembly relative to the pump bearing frame, and wherein the second motor adaptor is locked in place against the base plate at the slotted openings when corresponding fasteners are tightened into the at least some of the adaptor mounting holes aligned with the slotted openings.

13. The base plate system of claim 12, further comprising:
a coupling guard configured to fit over a coupling between the first motor assembly and the pump bearing frame,
wherein the base plate further comprises coupling guard mounting holes, and
wherein the coupling guard is configured to be mounted using the coupling guard mounting holes.

14. The base plate system of claim 13, wherein the coupling guard includes multiple overlapping panels with vented portions, and wherein the multiple overlapping panels are configured for adjusting a length of the coupling guard.

15. The base plate system of claim 12, wherein the fourth planar section includes a plurality of motor mounting holes, wherein the plurality of motor mounting holes are configured to align with feet of the second motor assembly.

16. The base plate system of claim 12, wherein the adaptor mounting holes are spaced lengthwise apart at a distance not greater than a length of each individual slotted opening of the slotted openings.

* * * * *